US006779515B2

United States Patent
Vaught et al.

(10) Patent No.: US 6,779,515 B2
(45) Date of Patent: Aug. 24, 2004

(54) CHARGE AIR CONDITIONING SYSTEM WITH INTEGRAL INTERCOOLING

(75) Inventors: August Thomas Vaught, Harper Woods, MI (US); Steve John OHara, Zionsville, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 10/210,264

(22) Filed: Aug. 1, 2002

(65) Prior Publication Data

US 2004/0020477 A1 Feb. 5, 2004

(51) Int. Cl.[7] .............................................. F02B 33/00
(52) U.S. Cl. .................. 123/563; 60/599; 123/41.31; 123/542; 165/41; 415/178
(58) Field of Search .................... 60/599; 123/41.31, 123/563, 542; 165/41; 415/177, 178, 179; 417/243

(56) References Cited

U.S. PATENT DOCUMENTS

| | | | | |
|---|---|---|---|---|
| 1,732,820 A | | 10/1929 | Siddeley | 123/559.1 |
| 2,200,744 A | | 5/1940 | Heinzelmann | 60/612 |
| 2,858,666 A | | 11/1958 | Fullemann | 60/599 |
| 3,829,235 A | * | 8/1974 | Woollenweber, Jr. | 60/599 |
| 4,373,356 A | | 2/1983 | Connor | 62/468 |
| 4,385,594 A | * | 5/1983 | Hauser, Jr. | 123/563 |
| 4,480,439 A | | 11/1984 | Yamane | 60/599 |
| 4,564,339 A | | 1/1986 | Nakamura et al. | 417/366 |
| 4,955,352 A | * | 9/1990 | Takeda | 123/559.1 |
| 5,261,356 A | | 11/1993 | Takahashi et al. | 123/41.31 |
| 5,435,289 A | | 7/1995 | Pendlebury et al. | 123/563 |
| 5,544,486 A | | 8/1996 | Lu | 60/599 |
| 5,775,885 A | | 7/1998 | Dreiman et al. | 417/553 |
| 6,006,540 A | | 12/1999 | Coletti | 62/430 |
| 6,526,751 B1 | * | 3/2003 | Moeckel | 60/599 |
| 6,557,345 B1 | * | 5/2003 | Moeckel | 60/599 |

* cited by examiner

*Primary Examiner*—Sheldon J Richter

(57) ABSTRACT

A charge air conditioning system, including a charge air booster, a refrigerant-to-air intercooler which is integral with the charge air booster, and a refrigeration system for supplying refrigerant to the refrigerant-to-air intercooler.

18 Claims, 3 Drawing Sheets

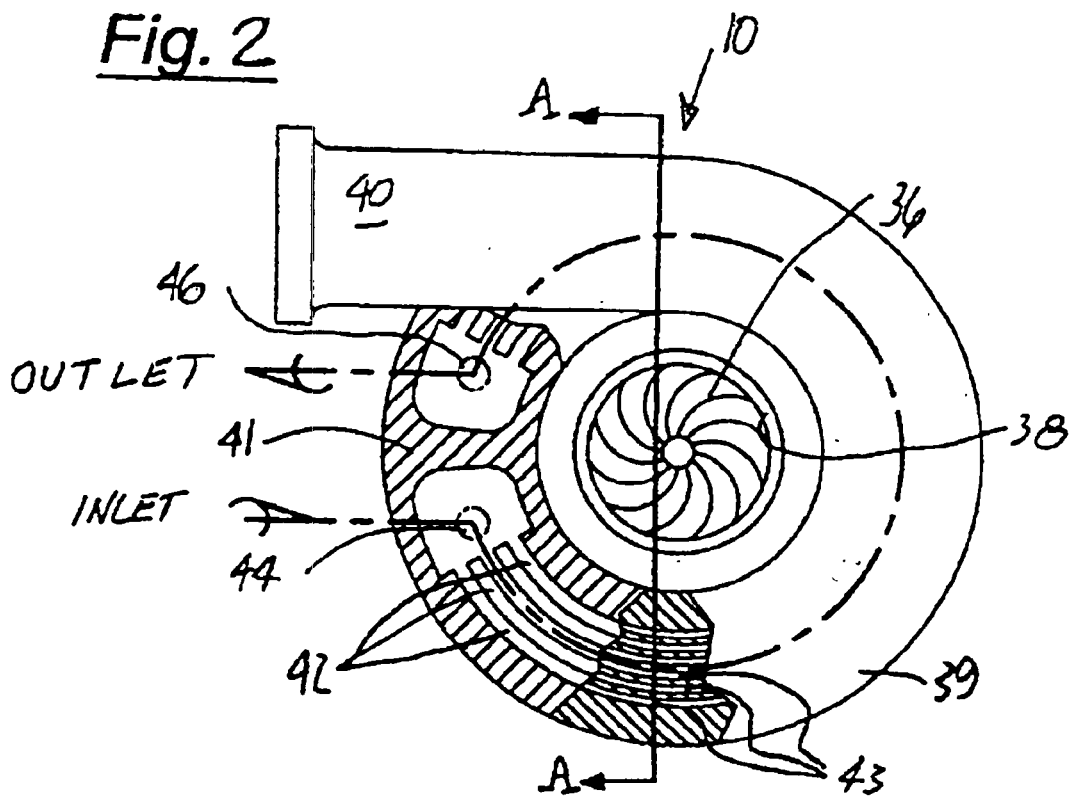
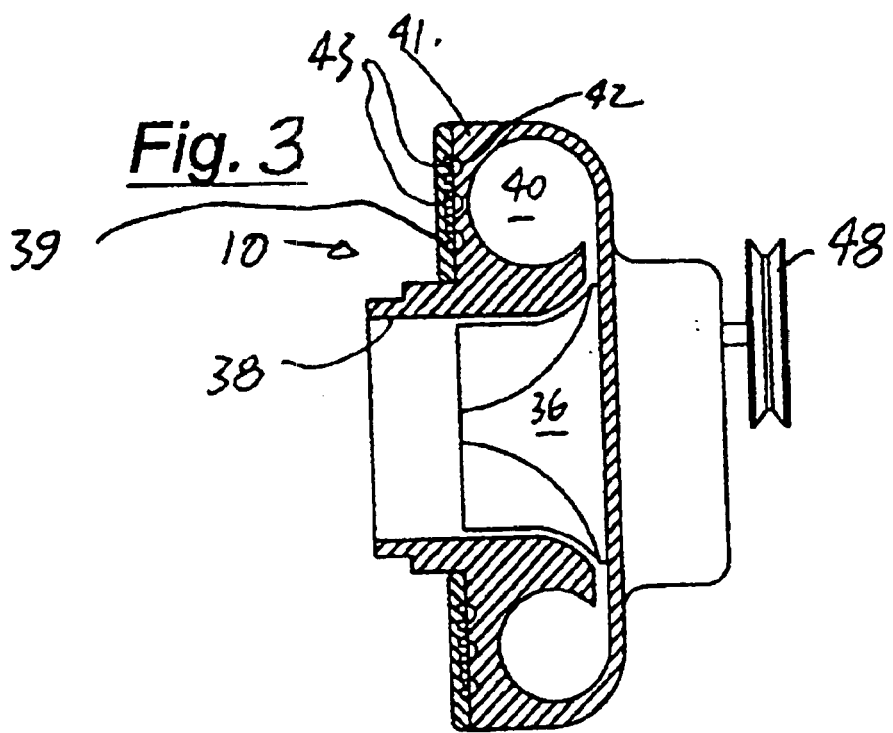

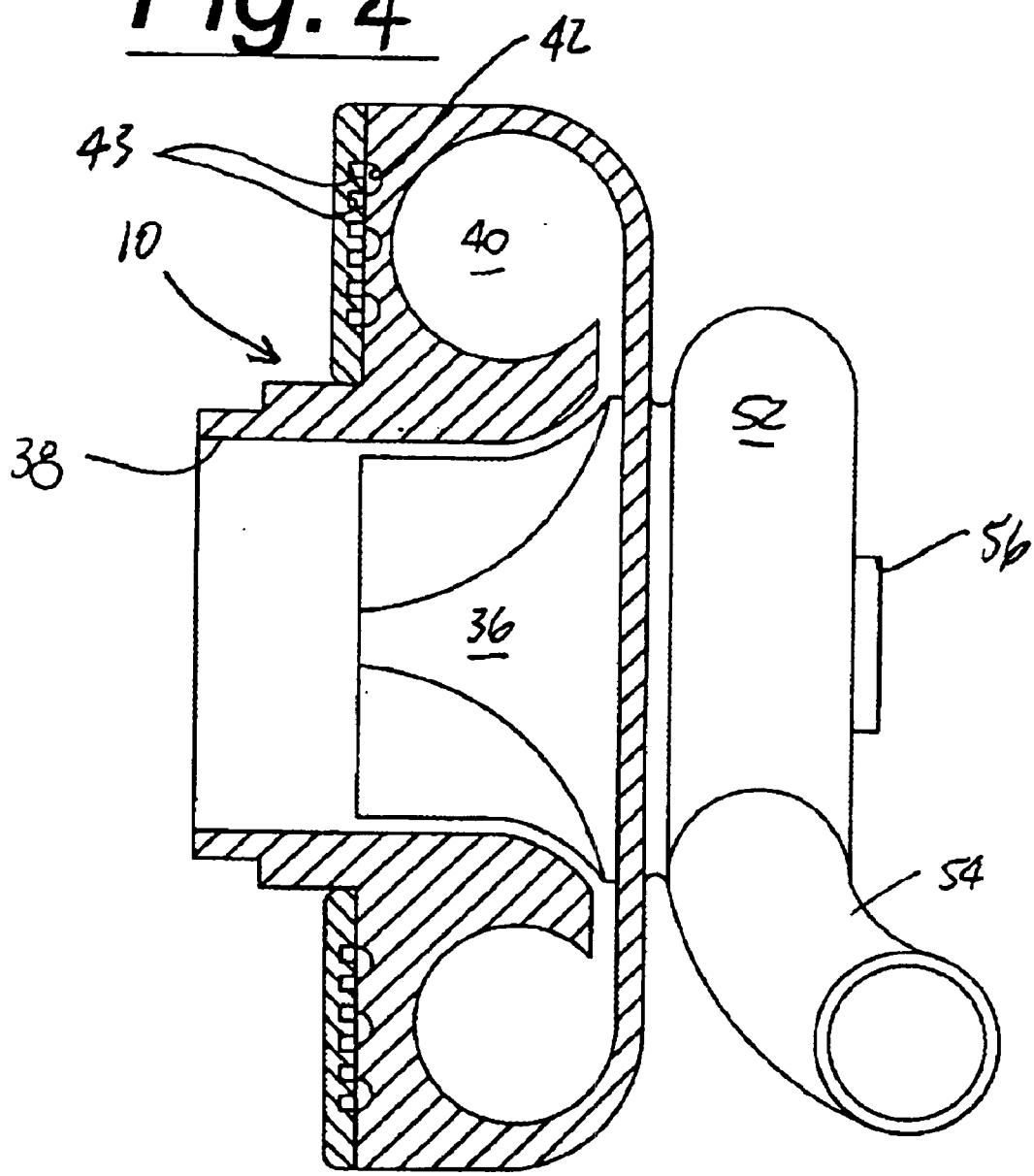

CHARGE AIR CONDITIONING SYSTEM WITH INTEGRAL INTERCOOLING

BACKGROUND OF THE INVENTION

1. Field of the Invention

The present invention relates to a system in which charge air for an automotive engine is compressed and cooled by the same rotating machine.

2. Disclosure Information

Automotive history is replete with designs for charge boosting of reciprocating combustion engines. A veritable plethora of systems have been used, including turbochargers, superchargers, and other such devices. A common problem associated with turbocharging and supercharging is the necessity of removing heat from the compressed air charge. Heat should be reduced from the charge for a couple of reasons, such as increasing density of the air charge, and helping to prevent knock. Unfortunately, the need for charge air heat extraction, which is commonly called intercooling, greatly increases the complexity of the charge air system because the charge air flowing from the turbocharger, supercharger or other device, must pass through a heat exchanger, which of course must be supplied not only with the charge air but also with a cooling fluid, whether it be ambient air or some other fluid. Accordingly, it has not generally been possible to close couple superchargers to engines very readily in any package efficient manner, given the necessity or at least the desirability, to use charge air intercooling.

A system according to the present invention solves the problems associated with prior boosting and charge air cooling systems by combining these functions into a single rotating machine. As will be explained in further detail below, the charge compression machine may comprise either a turbocharger or a supercharger, but in any event, the present machine uses refrigeration actually incorporated within the compression machine or booster to accomplish charge air cooling, thereby producing a very lightweight, compact, energy efficient, and powerful engine assist device.

SUMMARY OF THE INVENTION

An engine having a charge air conditioning system comprising a charge air booster, a refrigerant-to-air heat exchanger integral with the charge air booster, and a refrigeration system for supplying refrigerant to the refrigerant-to-air heat exchanger.

A charge air booster according to the present invention may comprise a supercharger driven by the engine directly and mechanically, or a turbocharger driven by exhaust gas from the engine, or a supercharger driven indirectly by an electric motor or hydraulically. In any event the refrigerant is preferably furnished to the heat exchanger as a liquid. The liquid may comprise either a liquid which does not change state in its course through the refrigerant-to-air heat exchanger, or a more traditional refrigerant which does change state from a liquid to a gas on its course through the refrigerant-to-air heat exchanger. In the latter case, the heat exchanger may comprise an evaporator which is mounted within the charge air booster, and with the refrigeration system providing liquid refrigerant to the evaporator, so that at least some of the refrigerant changes to a gas while the refrigerant is flowing through the evaporator so as to extract heat from air flowing through the charge booster. In the event that the booster comprises a centrifugal compressor, the evaporator may be mounted within a cover section of the compressor. As such, the evaporator may comprise an annular flow passage having an inlet for liquid refrigerant, an outlet for vaporized refrigerant, and an inner wall comprising a portion of the cover of the compressor. In the event that a liquid is used for the refrigerant, the annular flow passage feature may be retained. The flow passage will incorporate an inlet and outlet for liquid.

If a refrigeration system using a change of phase refrigerant is used as part of the current system, the refrigeration system may be used to provide refrigerant not only to the intercooler but also to an evaporator comprising a portion of a passenger cabin climate control system. In this case, the refrigerant system will of course be powered by the engine of the vehicle.

A charge air conditioning system with intercooling according to the present invention may be applied to a V-type engine. The supercharger and inner cooler may thus have outlets for providing chilled and compressed air to both banks of a V-type engine.

A method of providing compressed and thermally densified air charge to an engine includes the steps of filtering an air stream flowing into an engine, measuring the mass of air flowing into the engine, simultaneously compressing and extracting heat from the air charge, and conducting the compressed and thermally densified air to the engine.

It is an advantage of the present invention that air may both be compressed and chilled in a single machine taking up less space, weighing less and using less energy than prior art systems for compressing and intercooling charge air furnished to an engine.

It is a further advantage of the present invention that the present system will reduce costs associated with charge air compressing and intercooling.

Other advantages, as well as objects of the present invention will become apparent to the reader of this specification.

BRIEF DESCRIPTION OF THE DRAWINGS

FIG. 2 is a partially schematic representation of a charge air boosting and intercooling device according to one aspect of the present invention.

FIG. 3 is an example of a mechanically driven device according to the present invention taken along the line A—A of FIG. 2.

FIG. 4 is an example of a turbocharger device according to the present invention taken along the line A—A of FIG. 2.

DETAILED DESCRIPTION OF THE PREFERRED EMBODIMENTS

Figure 1:
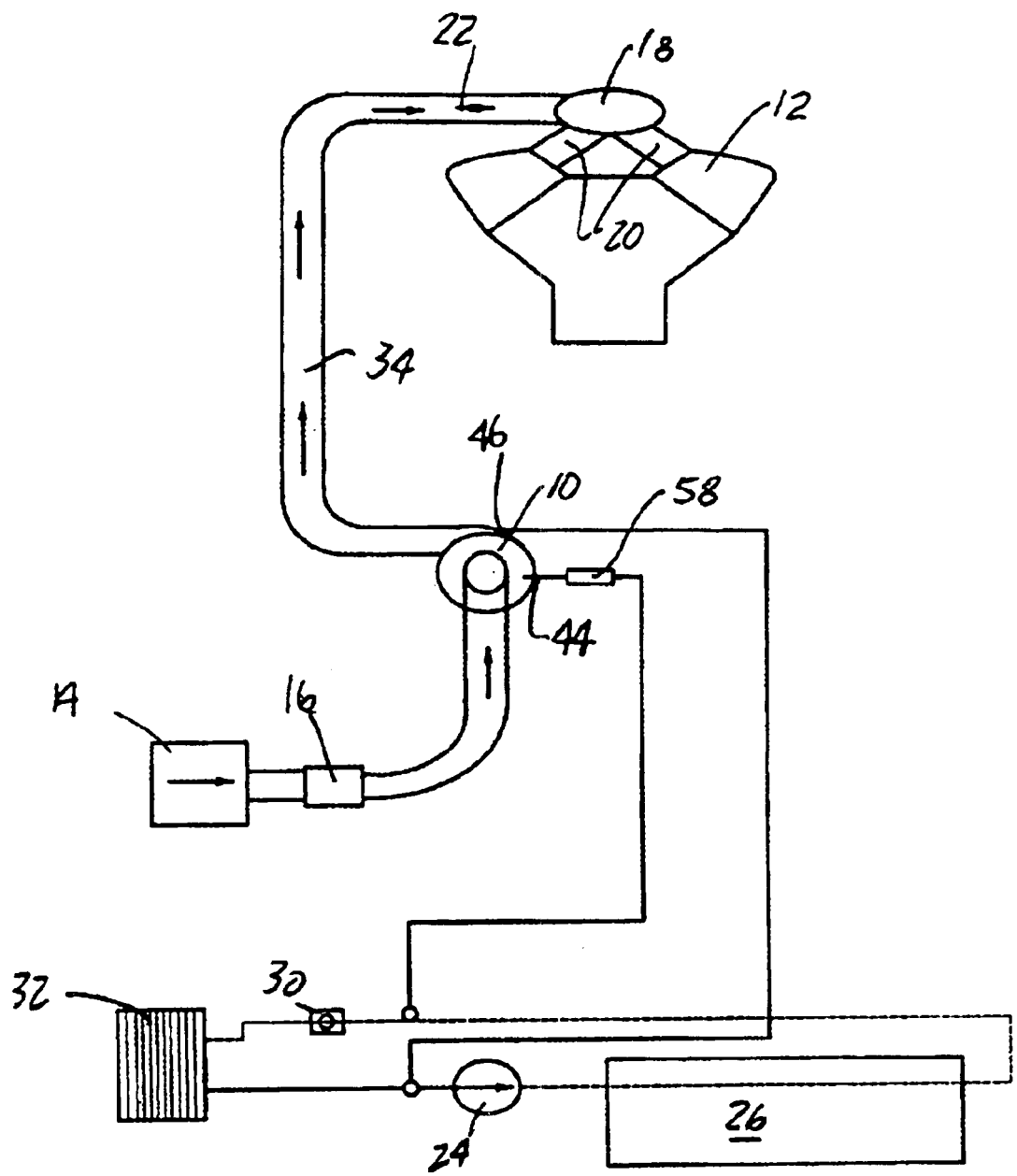
FIG. 1 is a schematic representation of an engine having a charge air boosting and intercooling system according to the present invention.

As shown in FIG. 1, booster 10 is applied to engine 12. The engine receives air from air filter 14 which flows through airflow sensor 16 into booster device 10. Air is compressed and then chilled or intercooled within booster device 10 before it flows through discharge pipe 34 and into plenum 18 and then through air distribution pipes 20 into engine 12. The flow of the air into the engine is partially controlled by throttle 22. Booster 10 has the capability of not only compressing, but also intercooling air furnished to engine 12 because booster 10 is furnished with refrigerant which flows through a control device 58 having gone through and being condensed by condenser 26 following compression by compressor 24. Control device 30 controls the flow to air conditioning evaporator core 32, which is used to provide cooling for the cabin air of the automotive vehicle.

As noted above, a system for providing refrigerant to booster 10 could also comprise a circulating liquid with condenser 26 being replaced with a tank which merely contains a liquid cooled by ambient air or other means. Such details are left to those skilled in the art and wishing to apply a system according to the present invention.

FIG. 2 illustrates a charge air booster and intercooling device according to the present invention in which air entering inlet 38 is picked up by impeller 36 and compressed and sent to outlet 40 into discharge pipe 34. According to the present invention, while the air is being compressed, it is simultaneously chilled because refrigerant circulates into inlet 44 in through a plurality of passages or channels in the outer wall of cover 41 and having circulated through channels 42, leaves the unit at outlet 46.

FIG. 3 illustrates greater detail of channels 42 and 43. It is noted that channels 42 are formed in cover section 41, whereas channels 43 are formed in cap plate 39. Those skilled in the art will appreciate in view of this disclosure that other types of refrigerant conducting channels and internal fin arrangements may be used with a charge air cooler and compressor according to the present invention.

The device of FIG. 3 has a pulley 48 to illustrate a belt drive from the engine's crankshaft or other rotating shaft of engine 12. Those skilled in the art will appreciate in view of this disclosure, however, that other types of drives, such as gear drive or chain drive, hydraulic drive, electric motor drive, or other types of drives could be used with the device of FIG. 3.

FIG. 4 illustrates a device in which impeller 36 is driven by a turbo device 52 having a turbine according to conventional usage, with the turbine having exhaust inlet 54 and outlet 56. The illustrated refrigerant channels 42 and 43 are similar to those illustrated in FIG. 3.

While the best mode for carrying out the invention has been described in detail, those familiar with the art to which this invention relates will recognize various alternative designs and embodiments for practicing the invention as defined by the following claims.

What is claimed is:

1. A method of providing a compressed and thermally densified air charge to an engine, comprising the steps of:
    filtering an air stream flowing into the engine;
    measuring the mass of air flowing into the engine;
    simultaneously compressing and extracting heat from the air charge; and
    conducting the compressed and thermally densified air charge to the engine.

2. A charge air conditioning system for an internal combustion engine, comprising:
    a charge air booster;
    a refrigerant-to-air heat exchanger which is integral with said charge air booster; and
    a refrigeration system, powered by the engine, for supplying liquid refrigerant to said refrigerant-to-air heat exchanger such that said refrigerant changes state from a liquid to a gas while flowing through said heat exchanger.

3. A charge air conditioning system according to claim 2, wherein said charge air booster comprises an engine driven supercharger and intercooler having dual outlets for providing chilled and compressed air to both banks of a V-type engine.

4. An engine having a charge air conditioning system comprising:
    a charge air booster;
    a refrigerant-to-air heat exchanger which is integral with said charge air booster; and
    a refrigeration system for supplying refrigerant to said refrigerant-to-air heat exchanger, with said refrigerant being furnished to said heat exchanger as a liquid which changes state to a gas within said heat exchanger as heat is extracted from charge air flowing though the heat exchanger.

5. An engine according to claim 4, wherein said charge air booster comprises a supercharge driven by the engine.

6. An engine according to claim 4, wherein said charge air booster comprises a turbocharger driven by exhaust gas from the engine.

7. An engine according to claim 4, wherein said refrigerant is furnished to the said heat exchanger as a liquid.

8. An engine according to claim 4, wherein said refrigeration system provides refrigerant to not only said intercooler, but also to an evaporator comprising a portion of passenger cabin climate control system.

9. An engine according to claim 4, wherein said charge booster and said heat exchanger are mounted within a common housing.

10. An engine according to claim 4, wherein said refrigerant system is powered by said engine.

11. An engine according to claim 4, wherein said booster comprises a centrifugal blower having a cover section with an annular wall, and with said annular wall having an inner face comprising a portion of a compressor section and an outer face comprising portion of said intercooler.

12. An engine according to claim 11, wherein said outer face has a plurality of refrigerant channels formed therein.

13. An engine according to claim 4, wherein said heat exchanger comprises an evaporator which is mounted within said booster, with said refrigeration system providing liquid refrigerant to said evaporator, and with at least some of said refrigerant changing to a gas while the refrigerant is flowing through said evaporator, so as to extract heat from air flowing through said charge booster.

14. An engine according to claim 13, wherein said booster comprises a centrifugal compressor, and wherein said evaporator is mounted within a cover section of said compressor.

15. An engine according to claim 14, wherein said evaporator comprises an annular flow passage having an inlet for liquid refrigerant, an outlet for vaporized refrigerant, and an inner wall comprising a portion of the cover of said compressor.

16. An engine having a charge air conditioning system comprising:
    a charge air booster comprising an engine driven supercharger;
    a refrigerant-to-air heat exchanger for removing heat from air which has been compressed by said supercharger, with said heat exchanger being integral with said supercharger; and
    a refrigeration system for supplying liquid refrigerant to said refrigerant-to-air heat exchanger, with said refrigeration system comprising a compressor and condenser adapted for supplying liquid refrigerant to a passenger compartment of a motor vehicle.

17. An engine according to claim 16, wherein said supercharger comprises a crankshaft driven supercharger.

18. An engine according to claim 16, wherein said supercharger comprises an exhaust driven turbocharger.

\* \* \* \* \*